（12）United States Patent
Melish et al.

(10) Patent No.: US 9,527,604 B2
(45) Date of Patent: Dec. 27, 2016

(54) UNMANNED AIR VEHICLE RECOVERY SYSTEM

(71) Applicant: Engineered Arresting Systems Corporation, Aston, PA (US)

(72) Inventors: Robert C. Melish, Willow Grove, PA (US); Kenneth J. Neeld, West Chester, PA (US); Richard L. Orner, Jr., Oreland, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 13 days.

(21) Appl. No.: 14/736,378

(22) Filed: Jun. 11, 2015

(65) Prior Publication Data

US 2015/0360797 A1   Dec. 17, 2015

Related U.S. Application Data

(60) Provisional application No. 61/997,847, filed on Jun. 11, 2014, provisional application No. 62/178,553, filed on Apr. 13, 2015.

(51) Int. Cl.
*B64F 1/02* (2006.01)

(52) U.S. Cl.
CPC ............... *B64F 1/02* (2013.01); *B64F 1/025* (2013.01); *B64C 2201/182* (2013.01)

(58) Field of Classification Search
CPC ...... B64F 1/02; B64C 2201/182; F41H 11/02; F41H 11/04; B64D 1/22
See application file for complete search history.

(56) References Cited

U.S. PATENT DOCUMENTS

| 1,686,298 | A |   | 10/1928 | Uhl |  |
|---|---|---|---|---|---|
| 1,731,091 | A |   | 10/1929 | Belleville |  |
| 1,748,663 | A |   | 2/1930 | Tucker |  |
| 3,176,327 | A | * | 4/1965 | Oberth | B64D 1/22 244/31 |
| 3,421,165 | A | * | 1/1969 | Pugh | B64D 1/22 182/150 |
| 4,311,290 | A |   | 1/1982 | Koper |  |
| 4,447,083 | A | * | 5/1984 | Campana | B64D 1/22 244/137.1 |

(Continued)

FOREIGN PATENT DOCUMENTS

EP   2186728 B1   4/2012

OTHER PUBLICATIONS

"Mini-RPV Launch System Conceptual Study" Dickard, H. E., Aug. 1977, Teledyne Ryan Aeronautical San Diego CA.*

(Continued)

*Primary Examiner* — Joseph W Sanderson
(74) *Attorney, Agent, or Firm* — Kilpatrick Townsend & Stockton LLP; Dean W. Russell; Kristin M. Crall

(57) ABSTRACT

Embodiments of the present disclosure relate generally to safe arrestment and recovery of an airborne unmanned air vehicle (UAV). Specific embodiments provide a 360 degree capture engagement cage that can recover a UAV approaching from any direction. The systems described herein may be used regardless of wind direction. The systems described herein may also be used as an air-only based system. Other embodiments may be used as including both an upper and lower tether for the engagement cage.

18 Claims, 11 Drawing Sheets

(56) References Cited

U.S. PATENT DOCUMENTS

| | | | |
|---|---|---|---|
| 4,627,821 A * | 12/1986 | Bradley | B64D 1/22 |
| | | | 244/137.2 |
| 4,753,400 A | 6/1988 | Reuter et al. | |
| 5,344,203 A * | 9/1994 | Tollenaere | B64D 1/22 |
| | | | 244/137.1 |
| 7,201,348 B1 | 4/2007 | Flammer | |
| 7,786,417 B2 * | 8/2010 | Sells, II | F41H 11/02 |
| | | | 102/400 |
| 8,028,952 B2 | 10/2011 | Urnes, Sr. | |
| 8,439,301 B1 | 5/2013 | Delisle et al. | |
| 8,567,718 B1 | 10/2013 | McDonnell et al. | |
| 8,857,754 B2 * | 10/2014 | Ferrari | B64F 1/02 |
| | | | 244/110 R |
| 9,085,362 B1 * | 7/2015 | Kilian | B64F 1/02 |
| 2009/0114761 A1 * | 5/2009 | Sells, II | F41H 11/02 |
| | | | 244/3.1 |
| 2010/0243799 A1 * | 9/2010 | Al-Qaffas | F41F 1/06 |
| | | | 244/110 C |
| 2012/0292430 A1 | 11/2012 | Ferrari et al. | |

OTHER PUBLICATIONS

International Patent Application No. PCT/US2015/035238, Search Report and Written Opinion dated Dec. 17, 2015.

* cited by examiner

FIG. 2 *(Prior Art)*

UNMANNED AIR VEHICLE RECOVERY SYSTEM

CROSS REFERENCE TO RELATED APPLICATIONS

This application claims the benefit of U.S. Provisional Application Ser. No. 61/997,847, filed Jun. 11, 2014, titled "Unmanned air vehicle (UAV) recovery system," and U.S. Provisional Application Ser. No. 62/178,553, filed Apr. 13, 2015, titled "Unmanned air vehicle (UAV) recovery system," the entire contents of each of which are hereby incorporated by reference.

FIELD OF THE DISCLOSURE

Embodiments of the present disclosure relate generally to safe arrestment and recovery of an airborne unmanned air vehicle (UAV). Specific embodiments provide a 360 degree capture engagement cage that can recover a UAV approaching from any direction. The systems described herein may be used regardless of wind direction. The systems described herein may be used as an air-only based system. Other systems described may include both an air and ground-based connection.

BACKGROUND

Many recovery systems for UAVs that are currently available use a net system that the UAV engages while still in flight. In some examples, the net system includes a vertical flat plane configuration, as shown in FIG. 1. There are also systems that use a boom-mounted vertical cable that engages a clip mechanism on wingtips of the UAV. In use, the UAV engages the cable along the edge of the wing, and the cable slides toward the wingtip in order to engage the clip mechanism. An example of this system is a shown in FIG. 2.

Typically, air vehicles land into the wind in order to take advantage of the lift provided. This added lift allows a decrease in the speed required to safely land. Many existing UAV recovery net systems must be positioned such that they are perpendicular to the wind direction. This positioning can allow the UAV to land into the net, in the direction of the wind. However, depending upon the size and configuration of the recovery net system, positioning the net to be perpendicular to the wind may be difficult and time-consuming in some instances. For example, in the case where the recovery net is mounted on a ship, the ship must be turned to position the net appropriately, which is not optimal.

Land-based UAV recovery net systems typically require a significant amount of secure, open land for deployment and operation. This is not always an option in uncontrolled, unfriendly, or densely populated urban areas. Accordingly, improved UAV recovery systems are desirable.

BRIEF SUMMARY

Embodiments of the invention described herein thus provide systems and methods for a UAV recovery system that allows a UAV to be safely captured from any direction, regardless of the wind direction. Embodiments also provide a UAV recovery system that allows for UAV capture at a wide range of altitudes and/or terrains. In a specific example, the UAV recovery system is provided as a 360° engagement cage for engagement of a UAV approaching from any direction. In a more specific example, the engagement cage may be a cylindrical net or cage.

DETAILED DESCRIPTION

Figure 1:
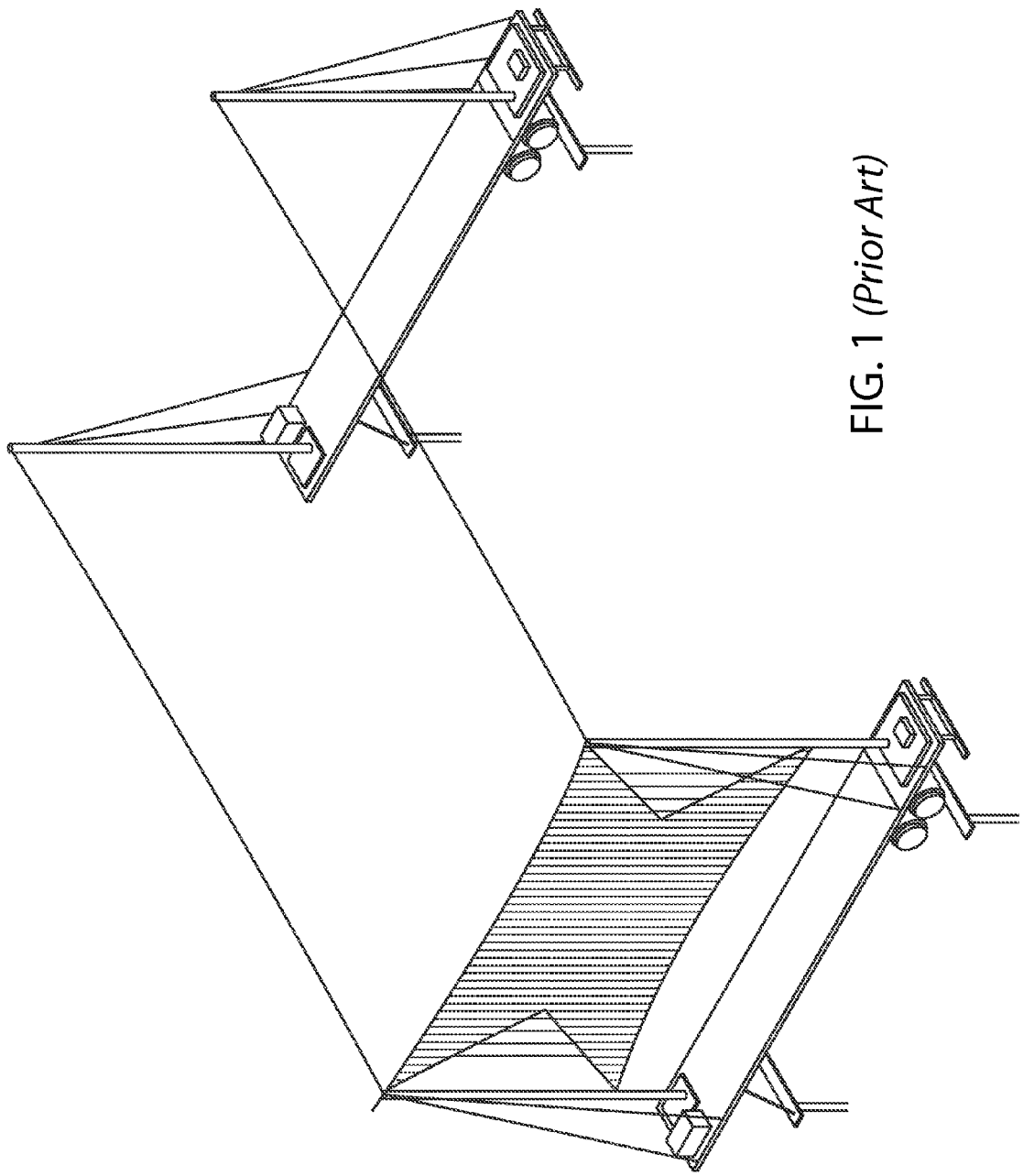
FIG. 1 shows a vertical net configuration of the prior art.
Figure 2:
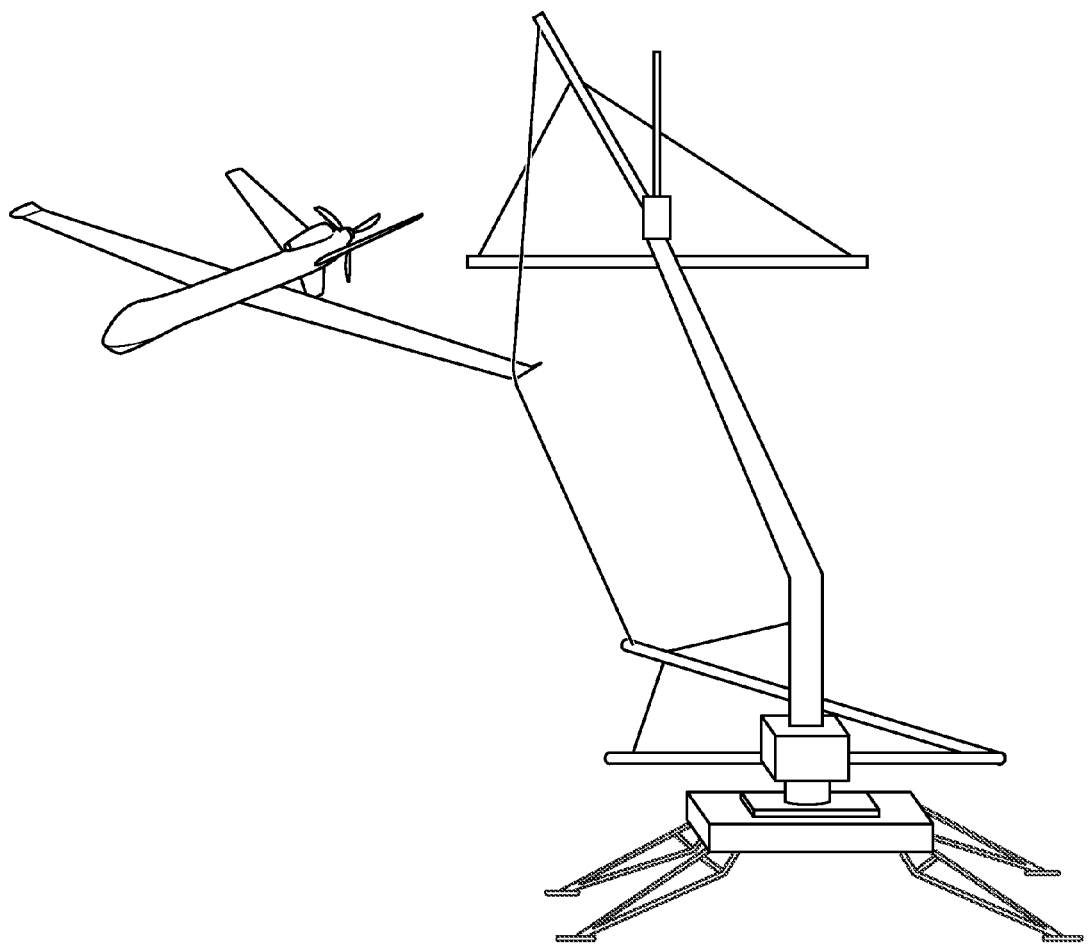
FIG. 2 shows a cable-based recovery configuration of the prior art.

Embodiments of the present invention provide a UAV recovery system 10 that can capture one or more UAVs approaching the system 10 from any direction, regardless of the wind direction. In the examples shown, the system 10 may include a 360 degree capture engagement cage 12. The 360 degree capture engagement cage 12 may be formed as a circular component and functions as a recovery net. It may have an upper support 14 and a lower support 16 between which may extend a net portion 18. In one example, the upper and lower supports 14, 16 are formed with a circular nature. This would provide a generally cylindrical engagement cage 12. In other examples, the upper and lower supports 14, 16 may be any other shapes, such as square-shaped, hexagonal, octagonal, or any other multi-sided geometry. The shapes of the upper and lower supports 14, 16 will generally dictate that shape that the net portion 18 takes. The general goal is to provide a multi-faceted or cylindrical capture portion that can capture a UAV traveling and approaching the cage 12 from any direction.

As will be described further below, the net portion 18 is designed to receive and recover one or more incoming UAVs 20. The net 18 may be a webbed net structure that cooperates with an anchoring mechanism 60 or other interface on the UAV. The anchoring mechanism or other interface may penetrate, adhere to, or otherwise temporarily secure the UAV with respect to the net 18. The engagement cage 12 may then be lowered in order to recover the captured UAV.

The net portion 18 may thus provide a 360° engagement opportunity for capturing a UAV 20. This allows a UAV to be safely captured from any direction, regardless of the wind direction. The generally cylindrical or circular nature of the engagement cage 12 means that it can be deployed the same way, regardless of the particular wind direction or weather condition. As shown, the engagement cage 12 may have a central axis A. A UAV 20 may approach the cage from any angle with respect to the central axis A in order to be captured. Various additional and optional features of the 360 degree capture engagement cage 12 will be described further below.

Figure 3:
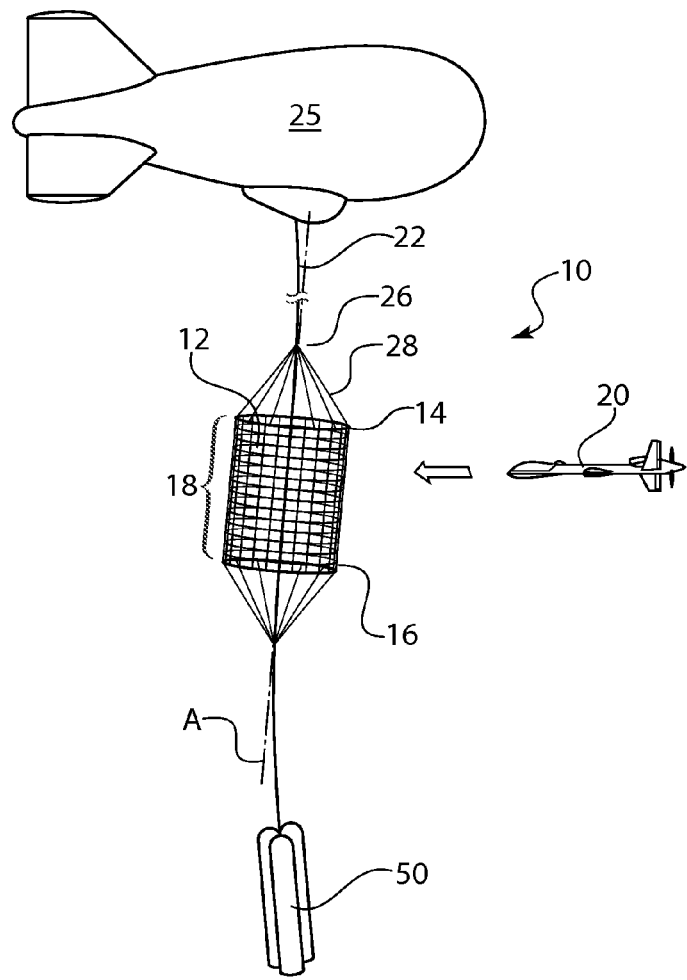
FIG. 3 shows a side perspective view of an air-based UAV recovery system according to one embodiment described.
Figure 4:
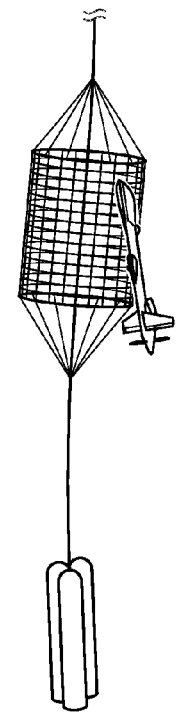
FIG. 4 shows a side perspective view of the system of FIG. 3 having recovered a UAV.

The UAV recovery system may be positioned along one or more tethers 22 that secure the system to an appropriate structure. In one example of use, the UAV recovery system 10 may be suspended from an autonomous airship 25, as shown in FIGS. 3 and 4. For this example, a lower securement feature is not provided. In other examples, the UAV recovery system 10 may be tethered from above and below. For example, the system 10 may be tethered from an aerostat 24 traveling above the system 10 and also tethered to the ground, a ground vehicle, or a ship deck, or other structure below the system 10. One example of this feature is a shown in FIG. 5.

These various tethering options allow the UAV recovery system 10 to be used at a wide range of altitudes. For example, if used with an autonomous airship 25 of FIG. 3, UAVs 20 may be recovered in a remote location and then returned to an operation base. No ground structure is necessary. This example also requires a relatively small footprint for UAV recovery operations. Additionally, this airborne only embodiment can provide an advantage where variations in terrain, urban structures, or other obstacles make it impractical or impossible to deploy traditional existing land or ship-based recovery systems. They may also be useful for operations in uncontrolled, unfriendly, or densely populated urban areas.

As shown in FIG. 3, the upper end 26 of the cage 12 may be secured to an airship tether 22. There may be one or more cords or lines 28 that secure the engagement cage 12 to the tether 22. The airship 25 may serve as the primary energy absorber, because it can move freely in the direction of the arrestment in order to allow the shock imparted to the net 18/cage 12 to be absorbed over a distance. It may be desirable to provide an optional lower counter weight 50 in order to stabilize the engagement cage 12 upon contact with the UAV 20. One example of a counter weight 50 may be gas bottles or any other type of weights.

Figure 6:
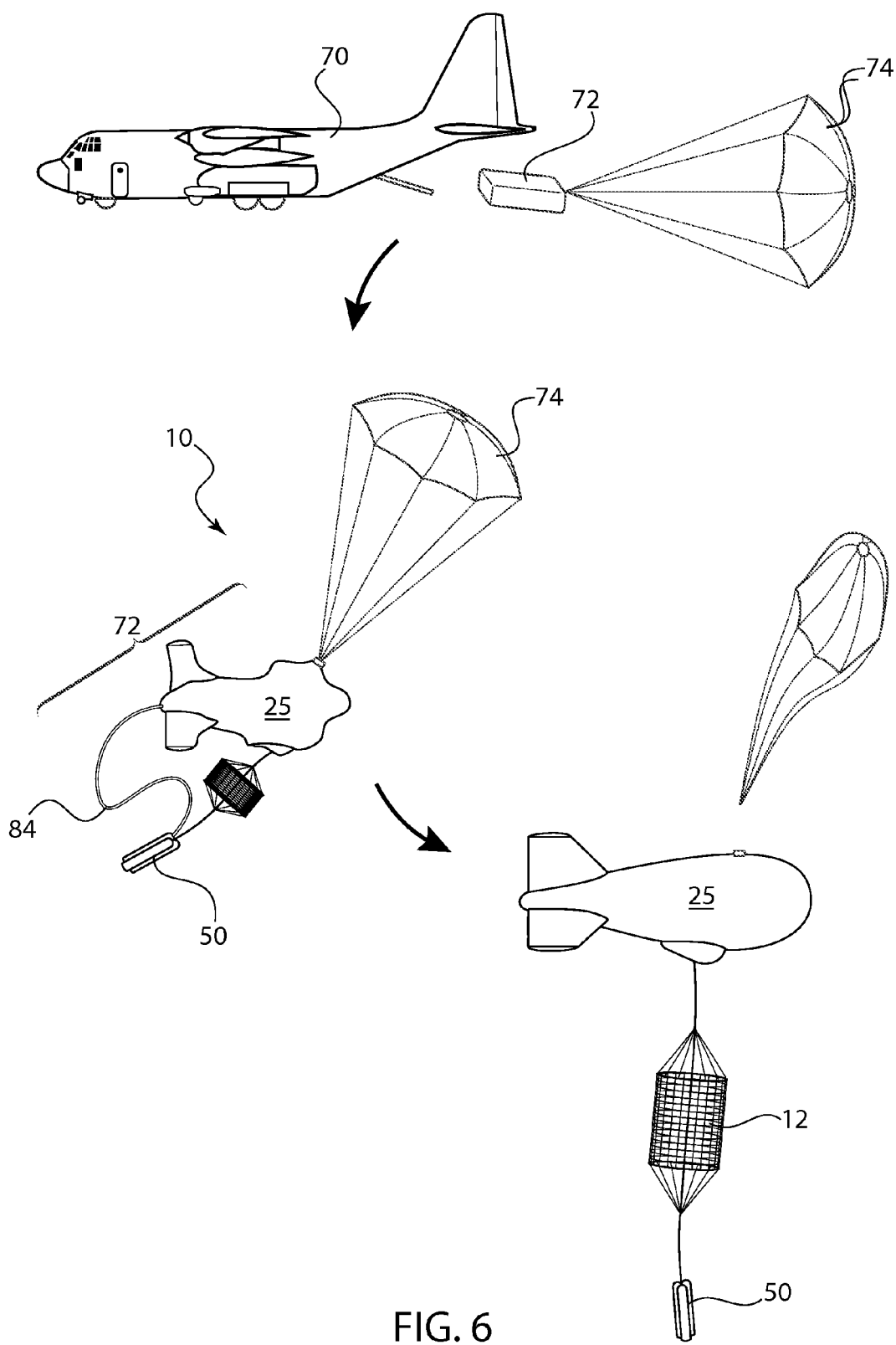
FIG. 6 shows a launching sequence for one embodiment described, in which an airship packaged as a unit is first deployed and then inflated.

Using gas bottles as it counterweights 50 may be particularly advantageous in the deployment options shown by FIG. 6. In this option, the UAV recovery system 10 may be deployed to a target area in mid-air, e.g., via a cargo plane 70. The system 10 may be tethered to an airship 25 and packaged as a unit 72. The packaged recovery system unit 72 may be associated with an optional parachute or parasail 74. The unit 72 may be loaded onto a cargo plane 70 and ejected at an appropriate altitude. Upon ejection, the airship 25 may rapidly inflate via air from the gas bottles 50 (which also function as counterweights). The inflation may take place via a breakaway inflation to 84, which would allow the gas bottles 50 to deliver inflation gas to the airship 25, and then release to hang below the engagement cage 12, as shown. The airship 25 may then navigate (or be remotely/externally navigated) to the target area. Once the airship 25 is inflated, the parachute/parasail 74 may detach. The cage 12 may fully deploy and remain in the target area until the UAVs are recovered. The airship 25 could then navigate to a secure recovery area. It is also possible for the system 10 to be launched from the ground.

Figure 5:
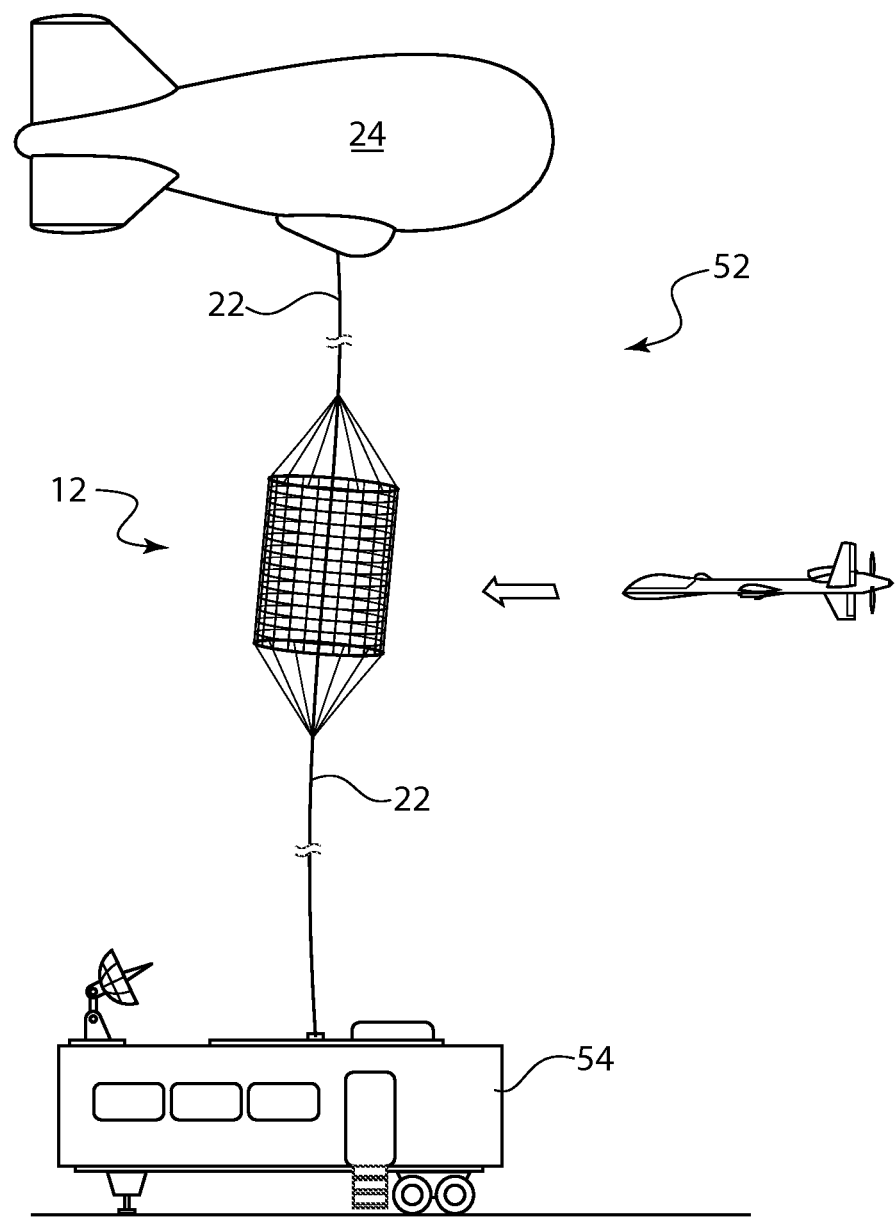
FIG. 5 shows a side perspective view of an air-based and lower-tethered UAV recovery system according to one embodiment described.

In another embodiment, there may be provided a ground vehicle or ship-mounted aerostat system 52. One example is illustrated by FIG. 5. In this example, the system 52 includes an aerostat 24 tethered to a 360 degree capture engagement cage 12, which is in turn tethered to a vehicle 54 below. The engagement cage 12 may be moved up and down the tether 22 via a pulley system. It is also possible to provide an upper tether that is separate from a lower tether. In this example, the two tethers provided may each have an extended payout line which could pull the engagement cage 12 up toward the aerostat 24 or lower the engagement cage down toward the lower securement location.

In one example, the vehicle 54 may be an operations vehicle/trailer. In another example, the vehicle 54 may be a ship, aircraft carrier, or water-based vehicle or stationary platform. In another example, a lower end of the tether 22 may be secured to a stationary point on the ground, such as a hook or other structure. These ground-supported configurations may provide control during capture of the UAV in a persistent service area. The system 52 can be deployed with a relatively small footprint for a ground or sea-based launch and recovery operation. The system 52 could be used for both short and long-term operations. In urban areas, the system could be raised above buildings or other obstructions for recovery operations.

The altitude of the aerostat 24 and the length of tether(s) 22 may be altered as needed. This provides a system that can capture UAVs at a large range of altitudes. Additionally, the size of the aerostat could be altered based on the energy (e.g., weight and speed) of the UAV to be captured. For example, a larger "balloon" may be used to capture a heavier UAV.

A raise/lower mechanism may be provided that functions to lower and raise the cage 12 along the tether 22. For example, this may be a pulley system, a manual system, an electronic system, or any combination thereof. This may allow the UAV recovery system 10 to be deployed, as well as for UAVs 20 to be unloaded from the cage 12 upon recovery, without lowering the aerostat 24.

Depending on the size of the net 18 or the cage 12 and the size of the UAV to be recovered, it may be possible to capture multiple UAVs with a single UAV recovery system 10. For example, multiple captures may be made prior to lowering the system to remove the UAV. In this example, the autonomous airship 25 or aerostat 24 may be positioned in a target area and remain in place until all UAVs have been recovered. The airship may then return to its base of operations for unloading.

Figure 7:
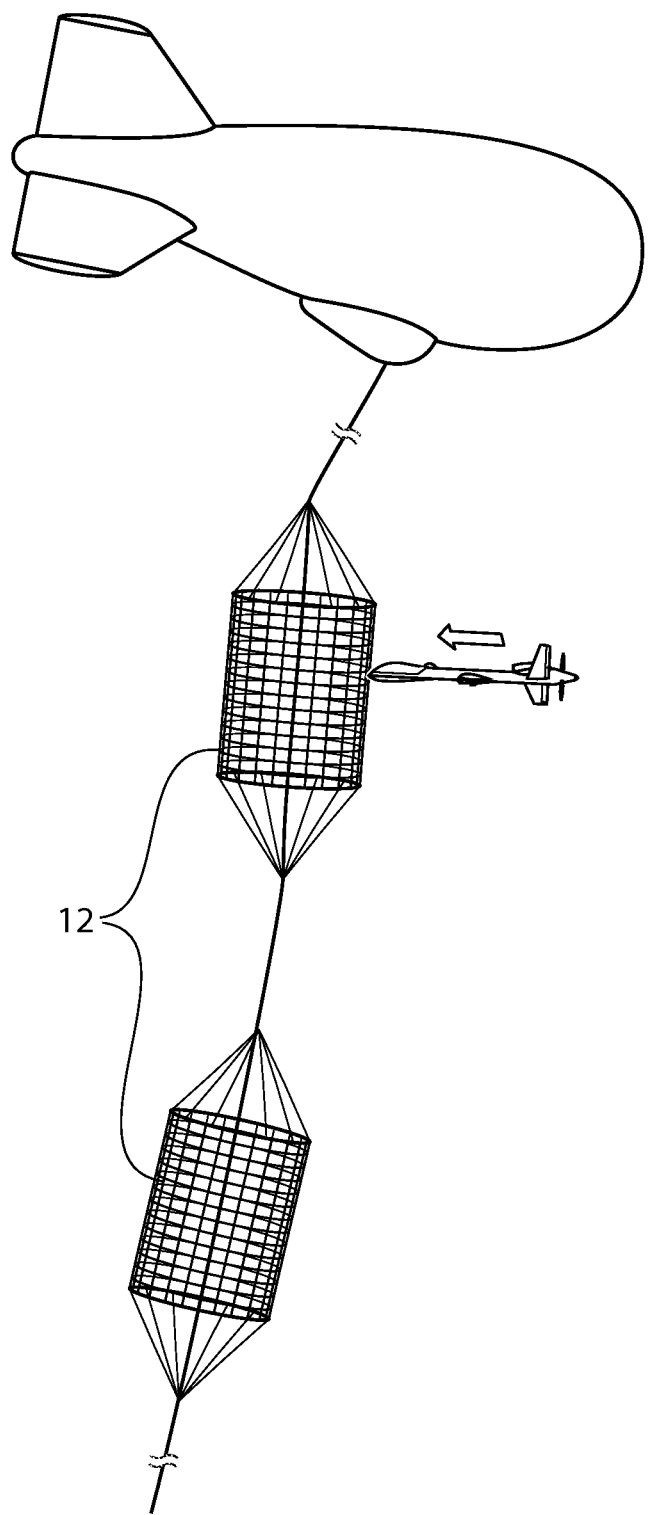
FIG. 7 shows an embodiment configured with more than one engagement cage.

In one option, it is possible to provide more than one engagement cage 12 along a tether 22, in order to allow capture of multiple incoming UAVs 20. One example of this is shown in FIG. 7.

Figure 8A:
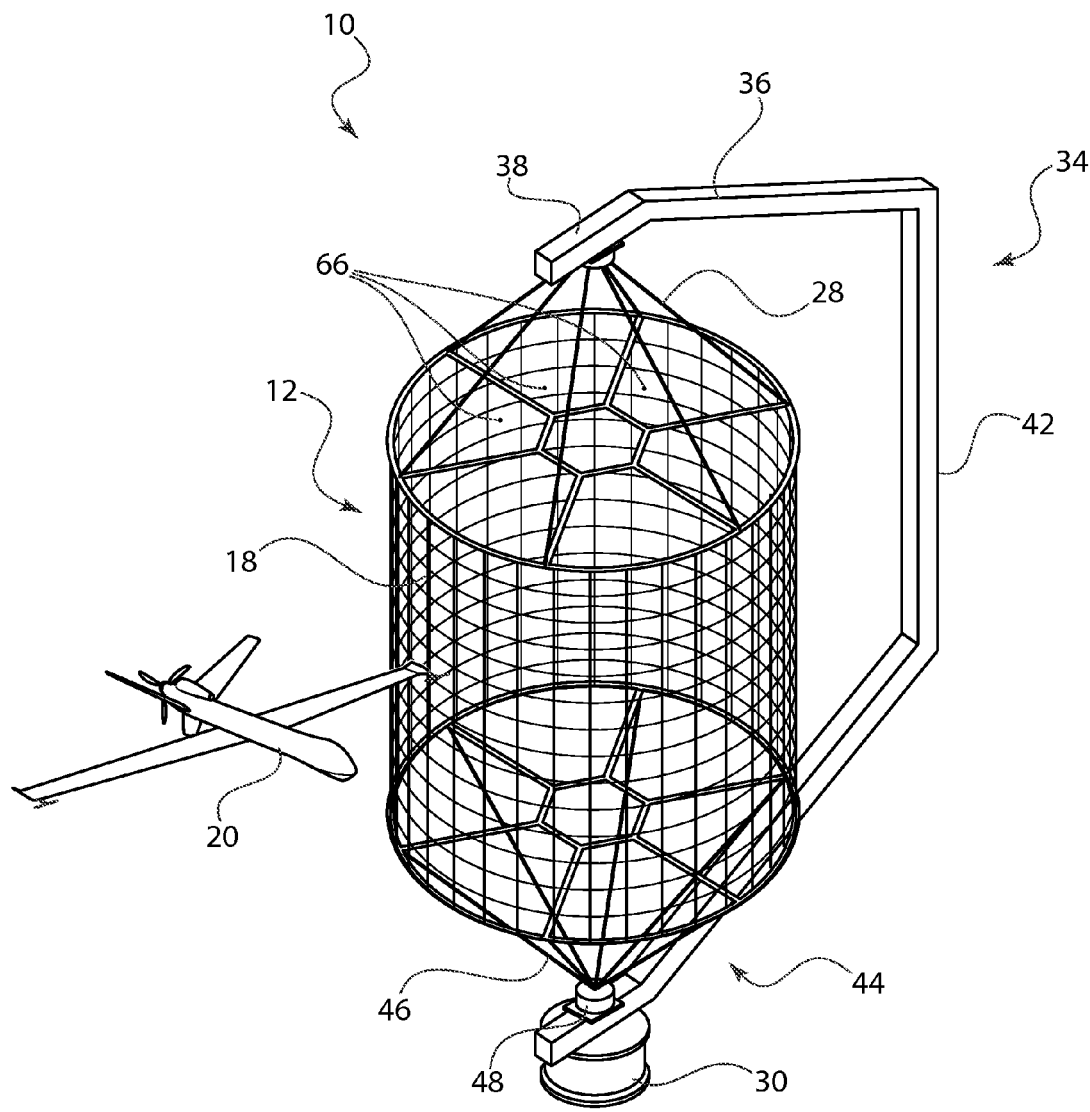
FIG. 8A shows a side perspective view of an engagement cage with a support structure.
Figure 8B:
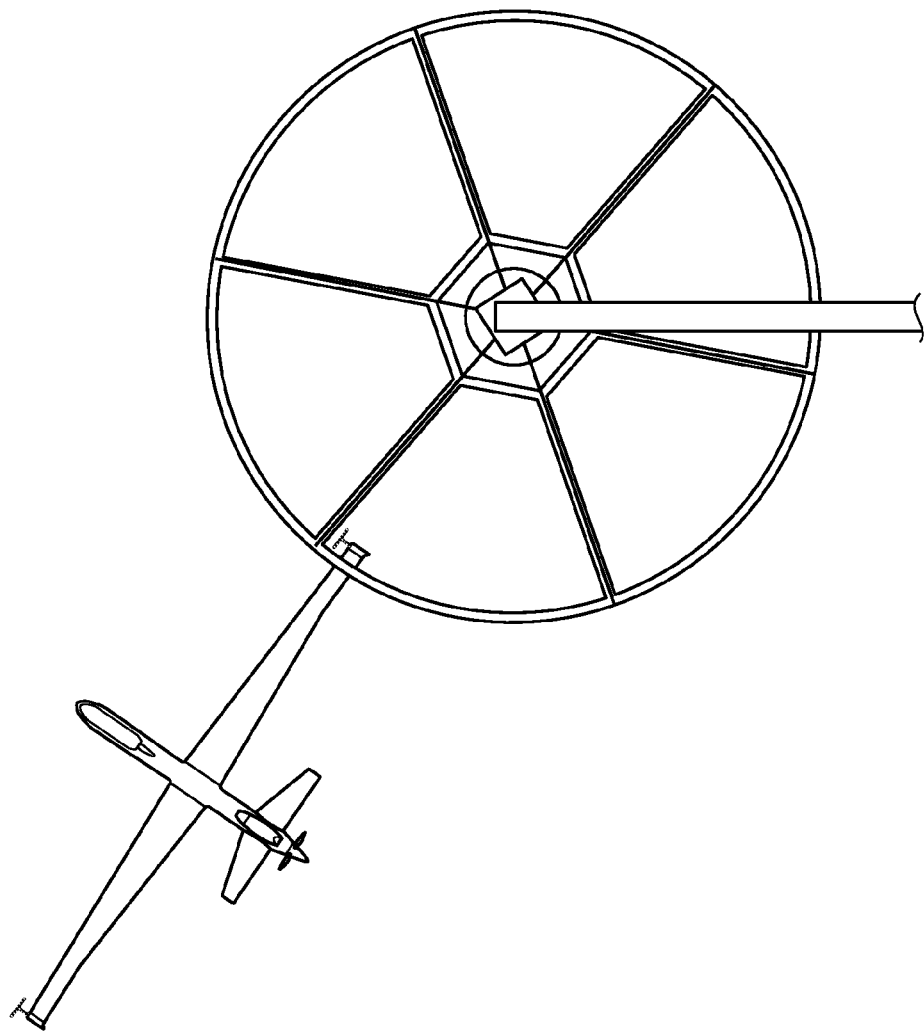
FIG. 8B shows a top plan view of the embodiment of FIG. 8A.

As is shown in FIGS. 8A and 8B, one embodiment may provide a 360 degree capture engagement cage 12 that is supported by a support structure 34. The support structure 34 may include an angled arm 36 that has an upper portion 38 secured to an upper net portion 28. There may also be provided a vertical portion 42 and a lower portion 44 secured to a lower net portion 46. It is also possible for the upper end of the 360 degree capture engagement cage 12 to be attached to an alternate support structure, such as a crane, boom, frame or stanchions. In any of these options, the structure could be attached to a rotating mechanism (at either an upper or lower portion of the cage), such that the support structure could be repositioned out of the path of an inbound UAV. This embodiment may be provided as a fixed recovery system 10, designed to have a fixed base that is positioned on and fixed to the ground, a ground-based vehicle, such as an operations truck or trailer, on an aircraft carrier or ship, or any other structure.

A mechanism to rotate the entire cage 12 may be used for orientation in the event that there is a need for multiple captures from the same direction. FIG. 8A illustrates one embodiment of a rotating mechanism 30. In this example, there is provided a rotating base 30. It should be understood, however, that a rotating mechanism 30 may also be provided at an upper portion of the cage 12. The rotating mechanism 30 can help rotate the engagement cage 12 such that an empty area of the net portion 18 is accessible for catching an incoming UAV 20. This is particularly useful if multiple UAVs are to be captured prior to lowering of the cage 12.

This recovery sequence may use an off-center capture approach. In this example, the UAV may engage the net or cage with an anchoring mechanism 60 at the wing tip. The cylindrical net 18 may be suspended within or otherwise with respect to the support structure 34. A rotating mechanism 30 and rotary energy absorber 48 may be provided. The rotating support structure base may allow the structure 34 to be repositioned out of the path of an inbound UAV.

As shown, it is also possible for the system 10 to include one or more optional energy absorbers 48. In one example, the energy absorber 48 may be a hydraulic brake, such as a Water Twister™, manufactured and sold by Zodiac Aerospace. A Water Twister™ is an energy absorbing water brake that converts kinetic energy to heat through fluid turbulence. This brake may include fluid with a rotor having vanes attached to an axle. The axle may be attached to the net structure. Movement of the vanes in the fluid creates turbulence/cavitation to absorb energy of the UAV. Other energy absorbers are possible and considered within the scope of this disclosure. For example, friction brakes are possible and considered within the scope of this disclosure. As another example, in one embodiment, a central portion 66 of the 360 degree capture engagement cage 12 may be provided with a cushioning or compressible material which can help facilitate shock absorption and aid in the absorption of the UAV impact.

Figure 9:
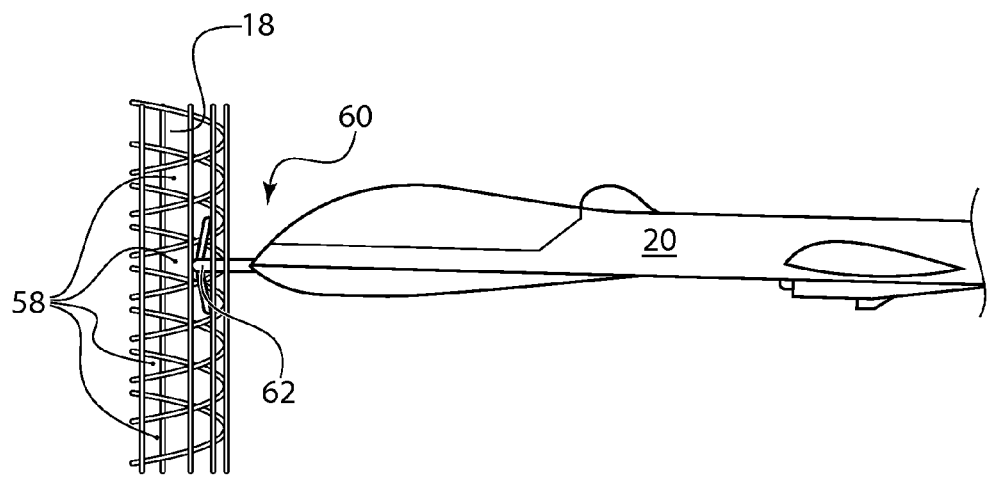
FIG. 9 shows a side perspective view of a UAV anchoring mechanism.
Figure 10:
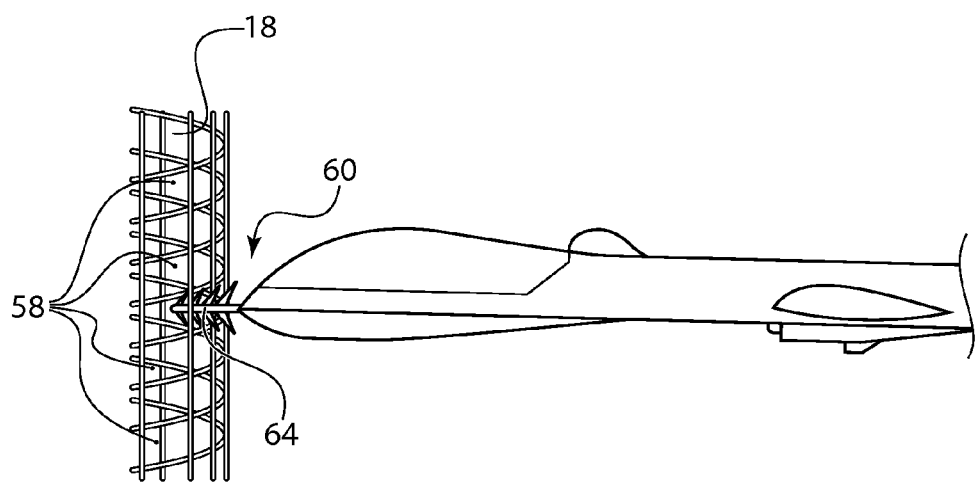
FIG. 10 shows a side perspective view of an alternate UAV anchoring mechanism

As shown in the figures, the net portion 18 is generally shown as having a series of openings 58 therethrough. The UAV 20 may have an anchoring mechanism 60 attached thereon. In use, the anchoring mechanism 60 engages one or more openings 58 of the net 18 of the cage 12 and securely fastens the UAV 20 thereto. Non-limiting examples of potential anchoring mechanisms 60 are shown in FIGS. 9 and 10. The anchoring mechanism 60 may be located on any portion of the UAV 20. For example, it may be positioned at the nose tip of the UAV, a wing tip of the UAV, or elsewhere.

In the example shown in FIG. 9, the anchoring mechanism 60 may be a spring loaded-toggle 62 that can penetrate the net 18 and then open to effectively trap the UAV 20 with respect to the net 18. In another example shown in FIG. 10, the anchoring mechanism 60 may be a net-penetrating barb 64. The barb 64 may penetrate the net and trap the UAV with respect to the net. The barb 64 may then be detachable, collapsible, retractable, in order to release the UAV from the net. For example, the barb 64 may fully detach. As another example, the barb 64 may collapse upon itself. As another example, the barb 64 may retract into the UAV fuselage. In another example, the anchoring mechanism may be a clip that secures the UAV to the net. Other anchoring mechanisms are also possible and considered within the scope of this disclosure. It should be understood, however, that other capture systems are possible, and may include the net being designed to envelop or capture at least a substantial portion of the UAV.

Alternatively, it is possible for other capture systems to halt the UAV with respect to the net. For example, the cage may be designed such that it envelops or bags the UAV after capture. For example, the net may envelop the UAV at the point of impact and stop the UAV from forward momentum.

Figure 11:
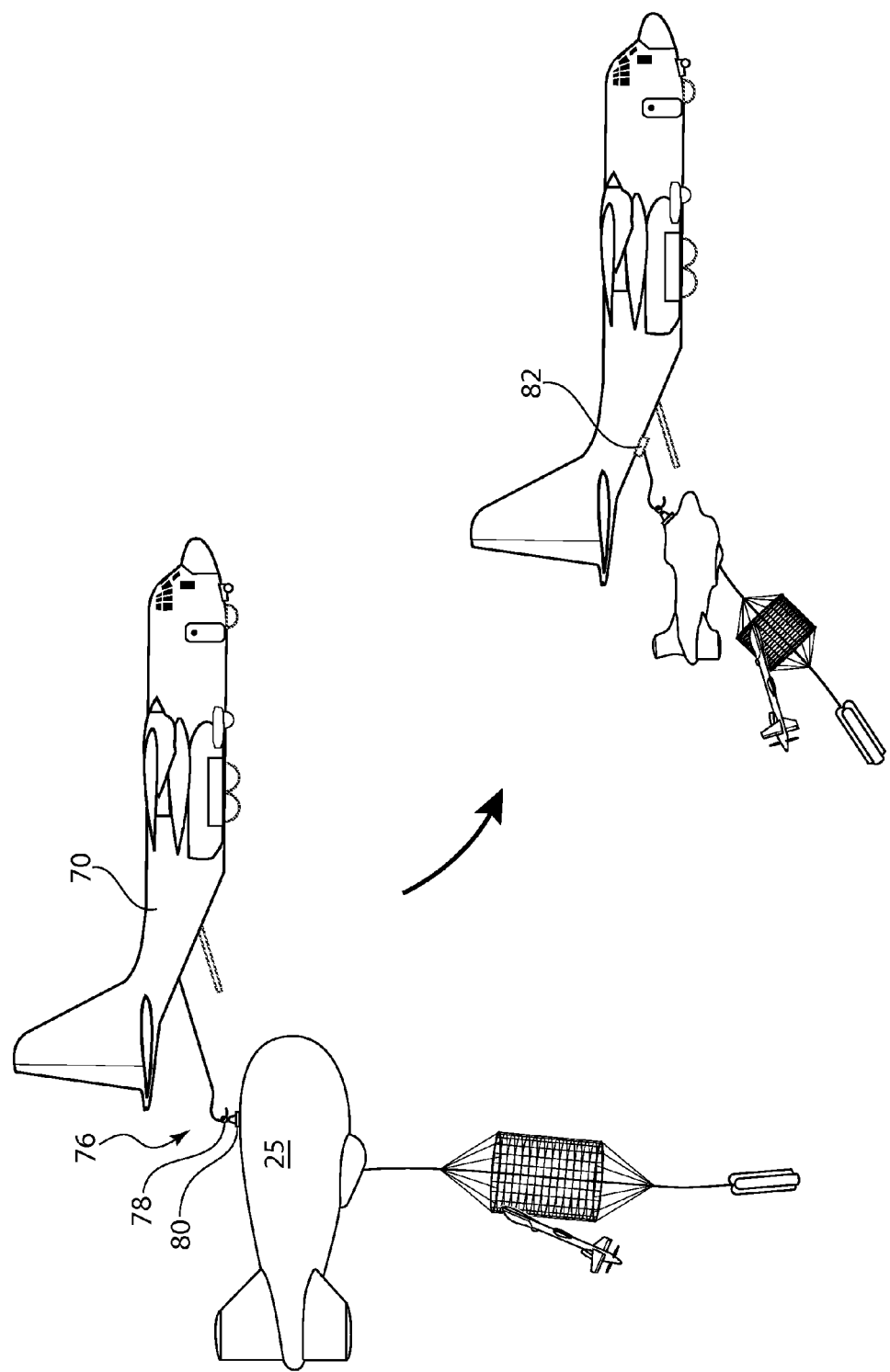
FIG. 11 shows a recovery sequence according to one embodiment, in which an airship is secured and retrieved by a cargo plane.

In order to retrieve the UAV recovery system 10, a cargo plane or helicopter or other aerial vehicle 70 may be equipped with a mid-air retrieval hook and winch system 76. One example of a recovery sequence as shown in FIG. 11. A hook element 78 may be extended from the aerial vehicle 70 and engage with a deflation valve 80 of the airship 25. This may cause the airship to deflate. A winch system 82, typically mounted on the aerial vehicle 70, may then pull the deflated airship 25 and the cage 12 on-board.

The net portion 18 may be formed from any appropriate material. It is generally desirable for the material to have a flexibility that is sufficient to envelope the UAV upon contact, but to also have a strength that is sufficient to withstand and halt the incoming force of a UAV. Examples of potential net materials include but are not limited to nylon web, polypropylene cords, polyester, or synthetic polymers. The net may be woven or non-woven. Other potential net designs may include metal cables that can capture a wing tip latch or other structure on the UAV. Further potential net designs may include a net portion made of Geckskin™ or other synthetic adhesive surface that can hold and detach objects of great weight. It is believed that a Geckskin or other synthetic adhesive net may operate to capture UAVs having anchoring mechanisms and/or UAVs without anchoring mechanisms.

In any of the embodiments described herein, the net portion may be fabricated from flexible or non-flexible members or a combination thereof. In one example, the materials of the 360 degree capture engagement cage 12 are designed to collapse inwardly upon UAV 20 impact in order to help absorb the initial energy. The net material moves upon impact with the UAV and is flexible enough to envelop the UAV, at least momentarily. This net movement may fully engage the UAV until its removal from the net and/or this net movement may simply allow enclosure of the UAV until the anchoring mechanism 60 (if provided) can be deployed.

Although the system has been described as having a 360 degree capture engagement cage, it should be understood that a shape other than cylindrical may be used to facilitate 360° engagements. For example, the engagement cage may have any other appropriate shape. The general intent is to provide a 360° capture area that provides more aerial coverage than a vertical net or a single cable.

The cage 12 and/or the UAV 20 may be equipped with electronic or optical guidance equipment to ensure accurate UAV to net engagement.

Figure 12:
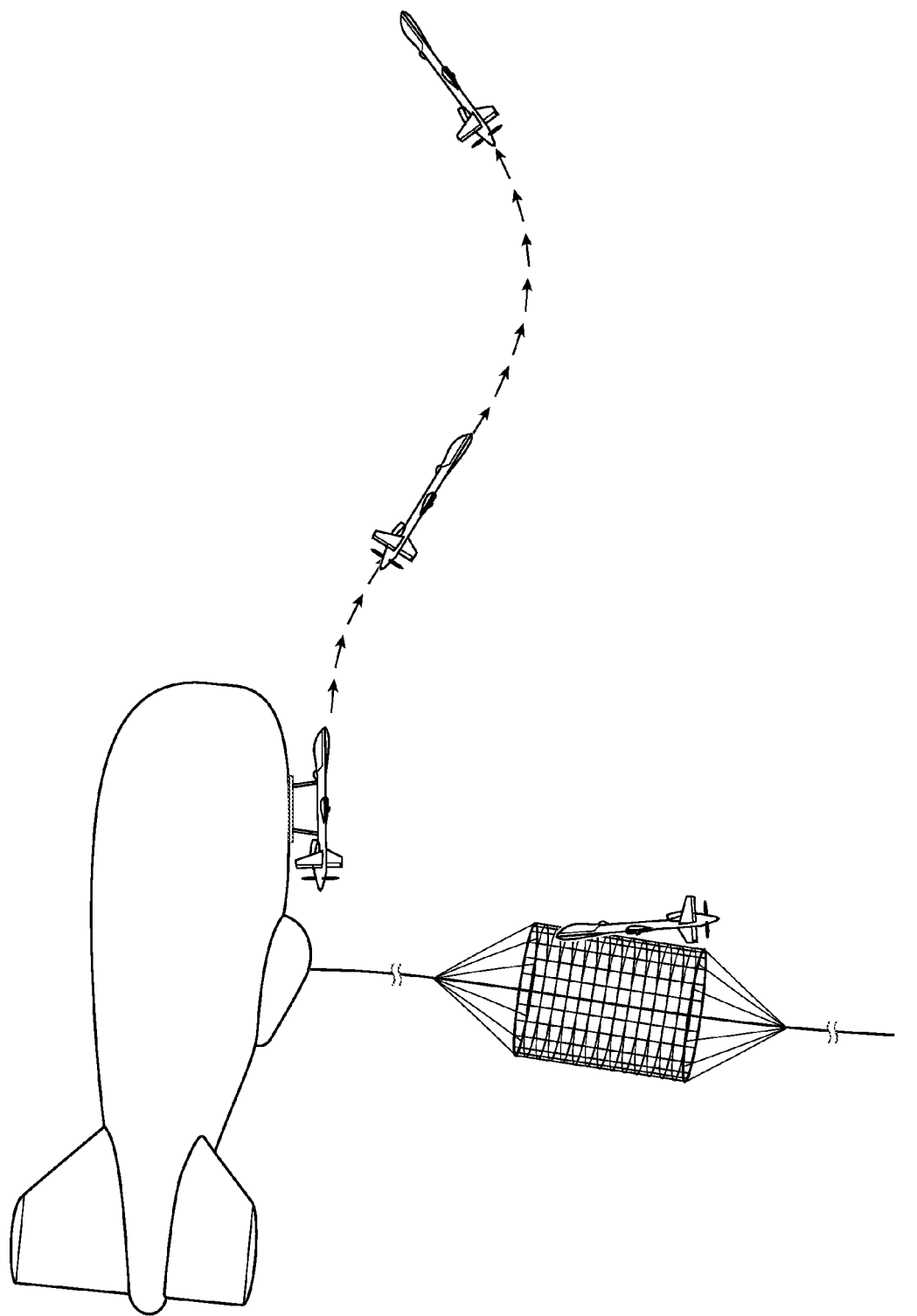
FIG. 12 shows a launching sequence according to one embodiment.

It is also possible to use the airship 25 or aerostat 24 to launch UAVs, as well as recover UAVs. One example of this is shown in FIG. 12.

In one example, there is provided an unmanned air vehicle (UAV) recovery system, comprising: a 360 degree engagement cage comprising an upper support, a lower support, and a circumferential net portion extending therebetween, an airship or aerostat configured to support the cylindrical engagement net via a tether. The upper support may be a generally cylindrical upper support, and the lower support may be a generally cylindrical lower support. The circumferential net portion may be a generally cylindrical net portion. The net portion of the 360 degree engagement cage may have one or more openings configured to capture a UAV. The UAV to be captured may have an anchoring mechanism for cooperation with the net portion. The anchoring mechanism can temporarily fix the UAV to the net.

In other examples, there is provided an unmanned air vehicle (UAV) recovery system for aerial deployment, comprising: a packaged unit comprising an autonomous airship tethered to a 360 degree engagement cage with one or more inflation bottles, and a parachute secured to the packaged unit. The packaged unit may be configured for aerial deployment from an aerial vehicle. Upon aerial deployment, the autonomous airship inflates via delivery of inflation gas from the one or more inflation bottles and the 360 degree engagement cage deploys, with the one or more inflation bottles functioning as a counterweight below the engagement cage.

There may also be provided a method for recovering an unmanned air vehicle (UAV) using the recovery system 1, comprising: deploying the recovery system from an autonomous airship. There may further be provided a method for recovering an unmanned air vehicle (UAV) using any of the recovery systems described, by deploying the recovery system from a land or water based structure and tethering the engagement cage to an aerostat.

Changes and modifications, additions and deletions may be made to the structures and methods recited above and shown in the drawings without departing from the scope or spirit of the disclosure or the following claims.

What is claimed is:

1. An unmanned air vehicle (UAV) recovery system for recovering a UAV, comprising:
   a 360 degree engagement cage comprising an upper support, a lower support, and a circumferential net portion extending therebetween,
   an aerial vehicle or structure configured to support the cylindrical engagement net via a tether;
   wherein the UAV to be recovered comprises an anchoring mechanism for cooperation with the net portion.

2. The recovery system of claim 1, wherein the upper support is a circular upper support, wherein the lower support is a circular lower support, and wherein the circumferential net portion is a cylindrical net portion.

3. The recovery system of claim 1, further comprising one or more counterweights extending from a lower portion of the 360 degree engagement cage.

4. The recovery system of claim 1, wherein the 360 degree engagement cage comprises one or more openings configured to capture a UAV.

5. The recovery system of claim 1, wherein the anchoring mechanism temporarily fixes the UAV to the net.

6. The recovery system of claim 1, wherein the anchoring mechanism comprises a net penetrating barb, a spring loaded toggle, or a clip.

7. The recovery system of claim 1, wherein the tether extends between the aerial vehicle or structure and a structure below the engagement cage.

8. The recovery system of claim 7, wherein the structure below the engagement cage comprises a ground vehicle.

9. The recovery system of claim 7, wherein the structure below the engagement cage comprises a water-based vehicle or stationary platform.

10. An unmanned air vehicle (UAV) recovery system for recovering a UAV and for aerial deployment, comprising:
    a packaged unit comprising an autonomous airship tethered to a 360 degree engagement cage with one or more inflation bottles,
    a parachute secured to the packaged unit;
    wherein the UAV to be recovered comprises an anchoring mechanism for cooperation with the engagement cage.

11. The recovery system of claim 10, wherein the packaged unit is configured for aerial deployment from an aerial vehicle.

12. The recovery system of claim 10, wherein upon aerial deployment, the autonomous airship inflates via delivery of inflation gas from the one or more inflation bottles and the 360 degree engagement cage deploys, with the one or more inflation bottles functioning as a counterweight below the engagement cage.

13. A method for recovering an unmanned air vehicle (UAV) using the recovery system 1, comprising:
    deploying the recovery system from the aerial vehicle or structure; and
    recovering a UAV.

14. The method of claim 13, wherein the aerial vehicle or structure comprises an autonomous airship.

15. The method of claim 13, wherein the aerial vehicle or structure comprises an aerostat.

16. A method for recovering an unmanned air vehicle (UAV) using the recovery system 1, comprising:
    deploying the recovery system from a land or water based structure and tethering the engagement cage to the aerial vehicle or structure; and
    recovering a UAV.

17. The method of claim 16, wherein the aerial vehicle or structure comprises an autonomous airship.

18. The method of claim 16, wherein the aerial vehicle or structure comprises an aerostat.

* * * * *